United States Patent

Schwarz

[19]

[11] Patent Number: 6,108,809
[45] Date of Patent: Aug. 22, 2000

[54] METHOD FOR SENDING MESSAGES FROM A LOWER-LEVEL CONTROLLER TO A HIGHER-LEVEL CONTROLLER

[75] Inventor: Leopold Schwarz, Korneuburg, Germany

[73] Assignee: Siemens Aktiengesellschaft, Munich, Germany

[21] Appl. No.: 08/836,499

[22] PCT Filed: Nov. 6, 1995

[86] PCT No.: PCT/EP95/04369

§ 371 Date: May 7, 1997

§ 102(e) Date: May 7, 1997

[87] PCT Pub. No.: WO96/15602

PCT Pub. Date: May 23, 1996

[30] Foreign Application Priority Data

Nov. 11, 1994 [DE] Germany .................. 94 11 787 U

[51] Int. Cl.[7] .................................................. H04L 1/18
[52] U.S. Cl. ................................................................ 714/749
[58] Field of Search .................................. 714/748, 749; 370/216

[56] References Cited

U.S. PATENT DOCUMENTS

| | | | |
|---|---|---|---|
| 4,399,531 | 8/1983 | Grande et al. ................... | 370/216 |
| 4,862,461 | 8/1989 | Blaner ............................. | 714/749 |
| 4,970,714 | 11/1990 | Chen et al. ..................... | 370/216 |
| 5,123,091 | 6/1992 | Newman .......................... | 710/30 |
| 5,245,616 | 9/1993 | Olson .............................. | 714/749 |
| 5,410,536 | 4/1995 | Shah et al. ...................... | 714/749 |
| 5,477,550 | 12/1995 | Crisler et al. .................. | 714/748 |

OTHER PUBLICATIONS

Melliar–Smith et al., Trans: a reliable broadcast protocol, IEEE, pp. 481 to 493, Dec. 1993.

Kachi et al., A Broadcast Protocol for Computer Network using Satellite Commnication, pp. 1278 to 1282, 1993.

*Primary Examiner*—Albert De Cady
*Assistant Examiner*—Shelly A Chase
*Attorney, Agent, or Firm*—Hill & Simpson

[57] ABSTRACT

A method for sending messages from a lower-level controller to a higher-level controller wherein a respectively different message is initially transmitted via a respective transmission path, a respective acknowledgment of the receipt of a respective message is returned along each respective transmission path, and a further message is then transmitted via the respective transmission path by which the respective acknowledgment was received.

5 Claims, 3 Drawing Sheets

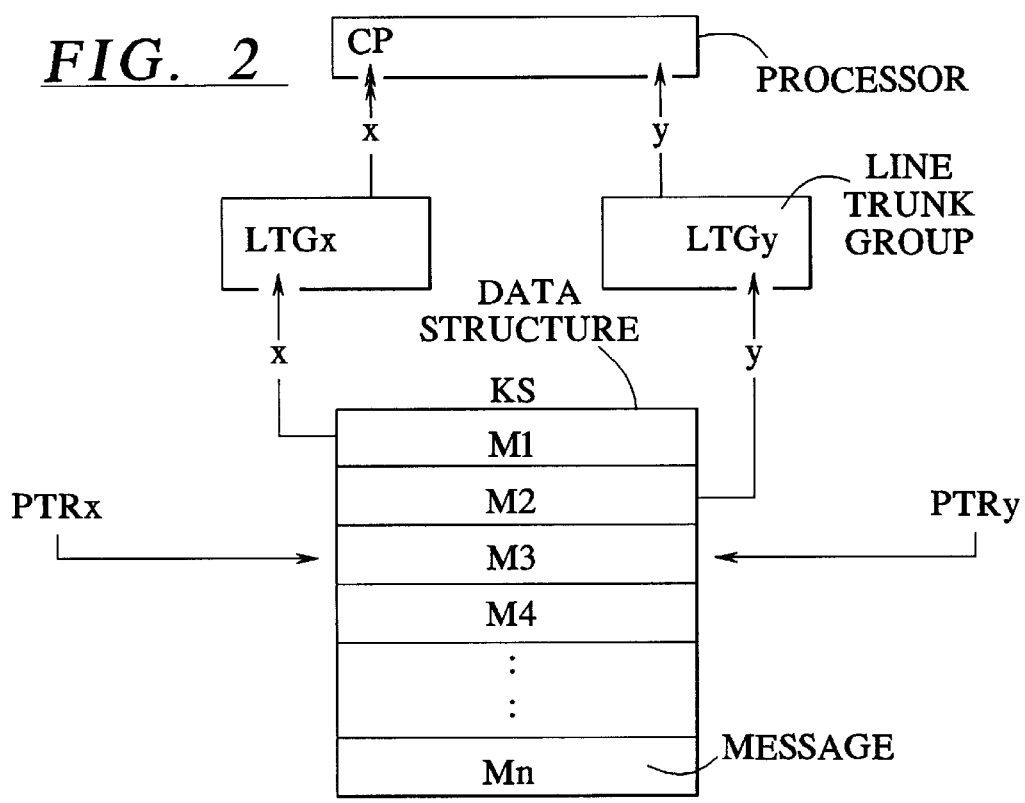
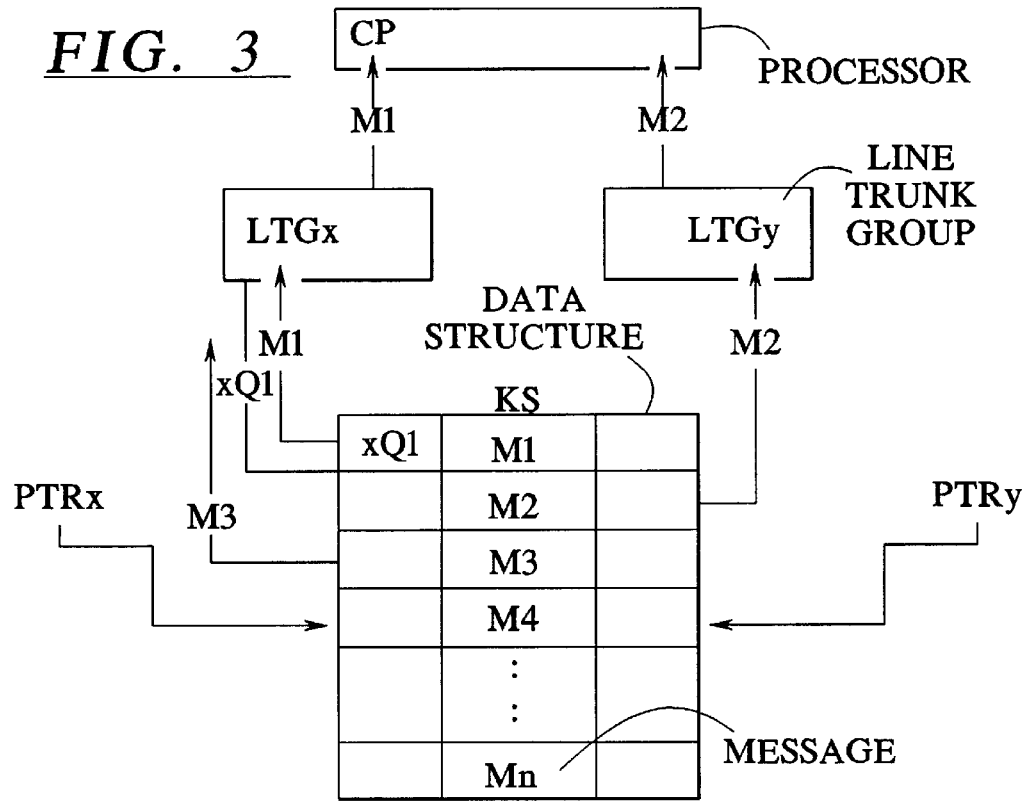

METHOD FOR SENDING MESSAGES FROM A LOWER-LEVEL CONTROLLER TO A HIGHER-LEVEL CONTROLLER

BACKGROUND OF THE INVENTION

The invention is based on the object of using an existing redundant physical path structure for sending (fault) messages from a lower-level controller to a higher-level controller, without unnecessarily having to load the processing capacity of the higher-level controller by redundant fault messages in the process.

If, for example, port faults occur on the peripheral in a switching system, then these events must be reported as quickly as possible to a higher-level controller in order to allow call attempts to such defective subscriber ports to be rejected as early as possible.

For reliability reasons, in an existing redundant physical path structure, peripheral devices always transmit such fault messages in parallel, that is to say a fault message is reported to the higher-level controller simultaneously via at least two different physical paths.

Such a procedure is disclosed, for example, in the document EP-A-0 033 228.

However, as a result of said procedure, the processing capacity of the higher-level controller is used more than once for one and the same item of information, namely one fault message.

The invention is based on the object of using an existing redundant physical path structure for sending (fault) messages from a lower-level controller to a higher-level controller, without unnecessarily having to load the processing capacity of the higher-level controller by redundant fault messages in the process.

This object is achieved by the features of claim 1. An exemplary embodiment of the invention will be explained in more detail, with reference to the drawing, in the following text.

SUMMARY OF THE INVENTION

In general terms the present invention is a method for sending messages from a lower-level controller to a higher-level controller, there being a plurality of physical transmission paths for sending the messages. A message is first of all transmitted, fro initialization, via each transmission path, these being different messages in each case. Each message which is received by the higher-level controller is acknowledged to the lower-level controller, the acknowledgment being sent back via that transmission path via which the message was received. A further message is always sent as soon as an acknowledgment of a previous message is received, the further message in each case being sent via that transmission path via which the acknowledgment was received.

In a further embodiment, the messages are sent via intermediate controllers in the transmission paths to the higher-level controller, each of which intermediate controllers like-wise requires all the messages for processing. Each message which is received by an intermediate controller is acknowledged to the lower-level controller. The acknowledgments are stored in a message-specific and transmission-path-specific manner in the lower-level controller. After they have been sent for the first time, all the messages are sent at least one further time in the direction of the higher-level controller, the intermediate controllers no longer passing these messages on to the higher-level controller. The lower-level controller uses the stored acknowledgments to ensure that a message which has already been acknowledged by an intermediate controller is not sent again to said intermediate controller.

For each transmitted message, receipt of a corresponding acknowledgment is monitored by a timer. A message for which no acknowledgment has been received by the time the associated timer times out is transmitted once again on another transmission path.

The present invention is also a transmitting device for sending messages from a lower-level controller to a higher-level controller. A data structure buffer-stores the messages in the lower-level controller. The messages are intended to be sent to a higher-level controller via a plurality of transmission paths. One pointer per transmission path in each case points to the next message to be sent within the data structure. For this purpose, after a message has been sent, the pointer is in each case moved to the next message to be sent. An initialization method initializes the transmission of the messages in that it initially sends a message via each transmission path. A transmission method always sends that message which is defined by the pointer to be the next to be sent, whenever an acknowledgment for a previous message has been received by the lower-level controller. This next message is sent via that transmission path via which the last acknowledgment was received.

In a further development the data structure is a chain structure, as a result of which it is possible to link messages into the data structure while messages are being sent from the data structure.

The invention ensures that events are reported rapidly to the higher-level controller, since all the transmission paths are used and the best transmission path, that is to say the fastest transmission path, is always chosen for sending an event.

The method according to the invention also achieves automatic load matching since, on the basis of the method according to the invention, fewer event messages are sent, automatically, via those transmission paths which cannot respond as quickly with an acknowledgement because they are more highly loaded. The method according to the invention thus operates even when a path is no longer available, or has failed.

One embodiment of the invention is a refinement based on a control structure which, apart from the central controller, also comprises intermediate controllers, which likewise require the messages from the lower-level controller for processing, and which are in each case located in the transmission path between the lower-level controller and the higher-level controller. In the case of said control structure, the refinement on the one hand results in the messages being transmitted as quickly as possible and without redundancy to the higher-level controller, and also ensures that the messages are transmitted completely and without redundancy to each of the intermediate controllers.

A further embodiment of the invention is as follows. In the absence of acknowledgement (time-out of the timer), this refinement allows the message which has not been acknowledged to be sent via another transmission path. In addition, the fact that the timer has timed out can be reported to a monitoring device, which initiates a check of the corresponding transmission path on the basis of this. The time duration of the timer can be set generously, since a further message is in fact produced via the same transmission path only if an acknowledgement has already been received.

The refinement of the data structure as a chain structure makes it possible to link subsequent event messages.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 depicts a device for receiving fault messages in a peripheral device in the FIG. 1 system;

FIG. 3 illustrates further transmission of error messages;

DESCRIPTION OF THE PREFERRED EMBODIMENTS

Figure 1:
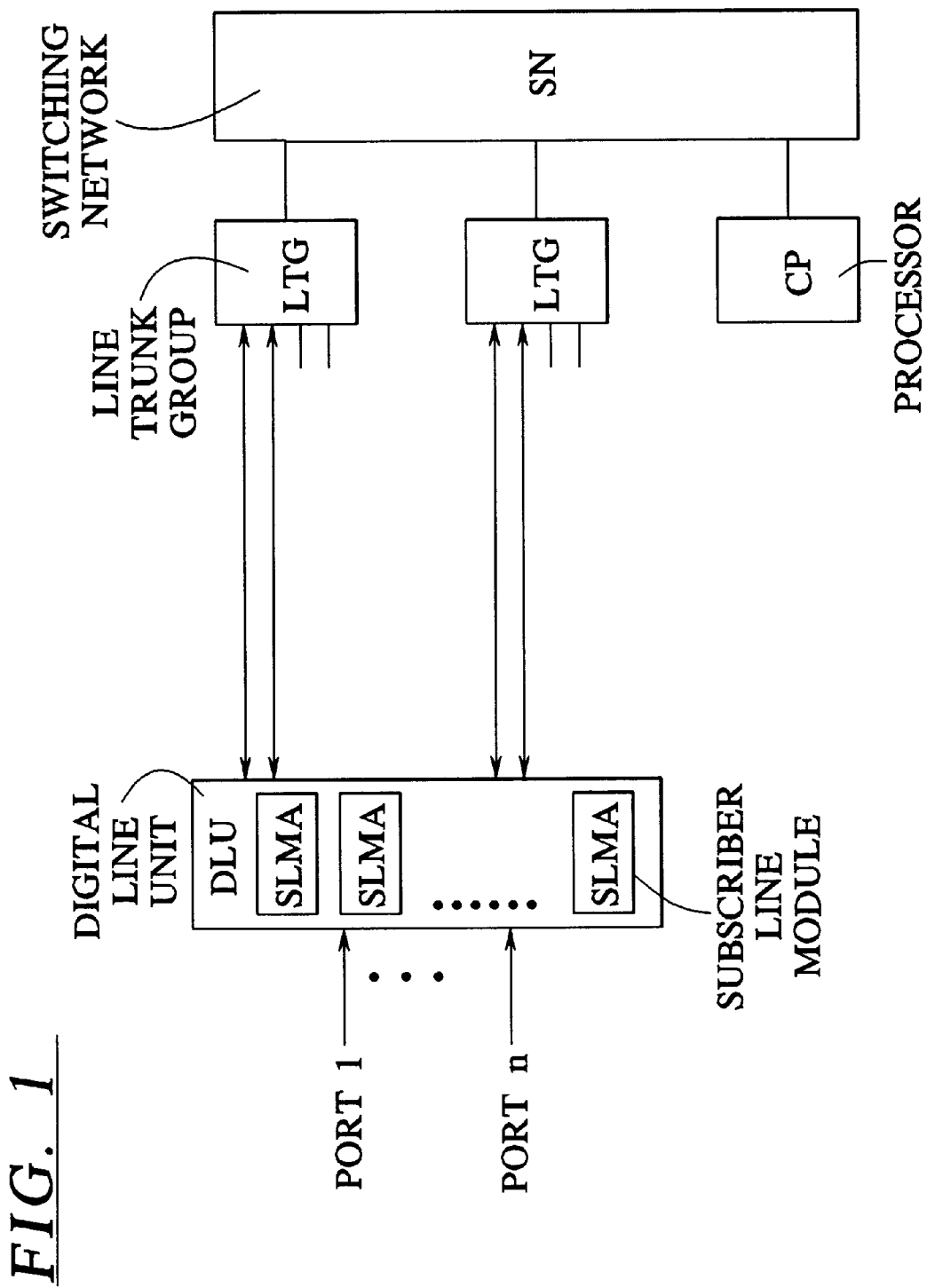
FIG. 1 is a block diagram of a switching system in which the method of the present invention is used.

FIG. 1 shows, by way of example, a real-time system, namely a switching system, in which the method according to the invention is used.

The main item in the illustrated switching system is a central switching network SN, to which a plurality of line trunk groups LTG and a coordination processor CP are connected.

A line trunk group LTG in each case comprises one group processor, which controls it and which, in addition, contains elements of the call processing software.

The coordination processor CP controls the entire switching system and, in particular, contains elements of the call processing software and of the operation and maintenance software.

A plurality of digital line units DLU, which preconcentrate the traffic in the direction of the line trunk groups LTG, are in each case connected to one line trunk group LTG.

A digital line unit DLU contains a plurality of subscriber line modules SLMA, which produce the basic connection from a subscriber to the switching system.

If the digital line unit now records port fault messages from the subscriber line modules SLMA, then these messages must be reported as quickly as possible to the coordination processor, in order that it can reject call attempts to such defective subscriber ports as early as possible.

FIG. 2 shows a device for receiving fault messages in a peripheral device, for example a DLU, in the abovementioned switching system.

The device comprises a chain structure KS, which can receive n port fault messages, as well as transmission pointers PTRx and PTRy, which point to that (data) element which is in each case to be sent next.

The mechanism which is produced with the aid of this device for handling the chain structure, and thus for sending fault messages, will be described in more detail in the following text.

At the start of the handling process, both transmission pointers point to the element 1. The handling thus starts with the transmission of a message from the element 1 to the x line trunk group, and by incrementing both transmission pointers to the element 2. In addition, a monitoring timer is started, which monitors the time until the return message (acknowledgement) is received from the x line trunk group.

Next, the message M2 is transmitted from the element 2 via the transmission pointer PTRy, a further timer is started, and both transmission pointers are then incremented by one element again. This completes the initialization of the mechanism, and both transmission pointers now point to the element 3.

The further handling and the further transmission of error messages are now carried out as a function of the arrival of acknowledgements from the line trunk groups. If, for example, the acknowledgement xQ1 arrives from the line trunk group LTGx for the message M1 from element 1, then this is noted appropriately in the element 1. In this case, the next message (in this case message M3) is sent for further handling, addressed by the PTRx, via the path on the x-side, that is to say the x-LTG. Both transmission pointers are then incremented by one element again. This case is illustrated in FIG. 3.

The procedure in the other case, namely on reception of an acknowledgement from the line trunk group LTGy, is analogous, that is to Bay the acknowledgement yQ2 is in this case noted in the corresponding element and, addressed via the transmission pointer PTRy, a message is transmitted via the y-side, that is to say the line trunk group LTGy, to the coordination processor.

Thus, in principle, in the method according to the invention, the next element is not sent unless an X-acknowledgement or a Y-acknowledgement has already been received. In this case, after the two transmission pointers have been incremented, the next element is sent via that transmission path via which the acknowledgement has already been received. As a deviation from this mechanism, two successive elements are first of all transmitted on the X-side and Y-side for initialization of the method, without having to wait for the acknowledgement of the first element before the second element is transmitted.

Figure 4:
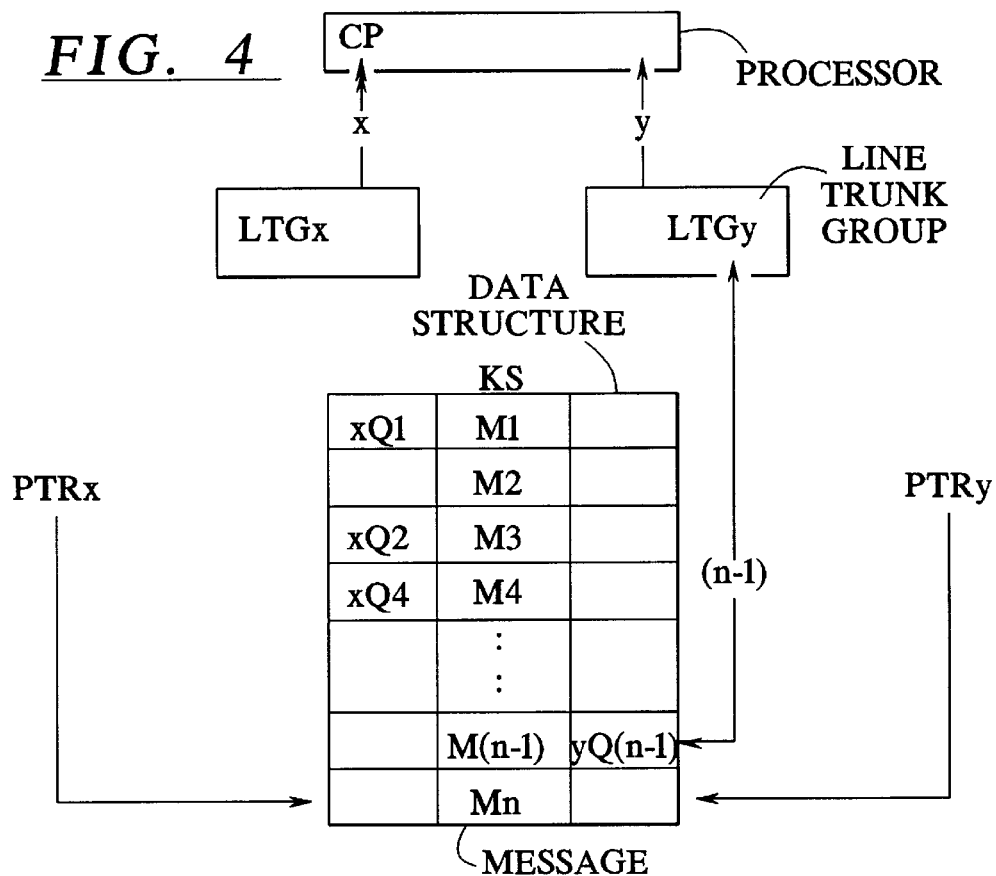
FIG. 4 shows the position of transmission pointers at the end of a first pass through the peripheral device.

FIG. 4 shows the position of the transmission pointers at the end of the first pass through the KS. In FIG. 4, it is assumed that the element (n−1) has been sent via the LTGy.

After the elements (n−1) have been transmitted, both transmission pointers are set to the element n. After the acknowledgement character yQ (n−1) has been received for the element (n−1), the message Mn, addressed via the transmission pointer PTRy, is sent via the y-side path, that is to say the line trunk group LTGy. Both transmission pointers are thus once again set to the element 1.

In addition to this, the receipt of the acknowledgement yQ (n−1) means that all the expected acknowledgements (with the exception of the acknowledgement yQ(n)), have already been received on the y-side. In contrast to this, no such statement may yet be made on the x-side, that is to say only acknowledgements up to xQ (n−k) have been received by this time on the x-side, k being an integer which is still unknown.

Since, before the second pass through the chain structure which now follows, it has been presupposed that the element (n−1) has already received the acknowledgement character yQ (n−1), two cases may now occur in the second pass, namely a case a, in which the acknowledgement character yQn for the message Mn has been received as the last acknowledgement character before the start of the second pass, and a case b, in which an acknowledgement character xQ has been received for the element (n−k) as the last acknowledgement character before the start of the second pass, it being necessary in case b for the messages M (n−k+1) to Mn have been sent via the y-side.

Figure 5:
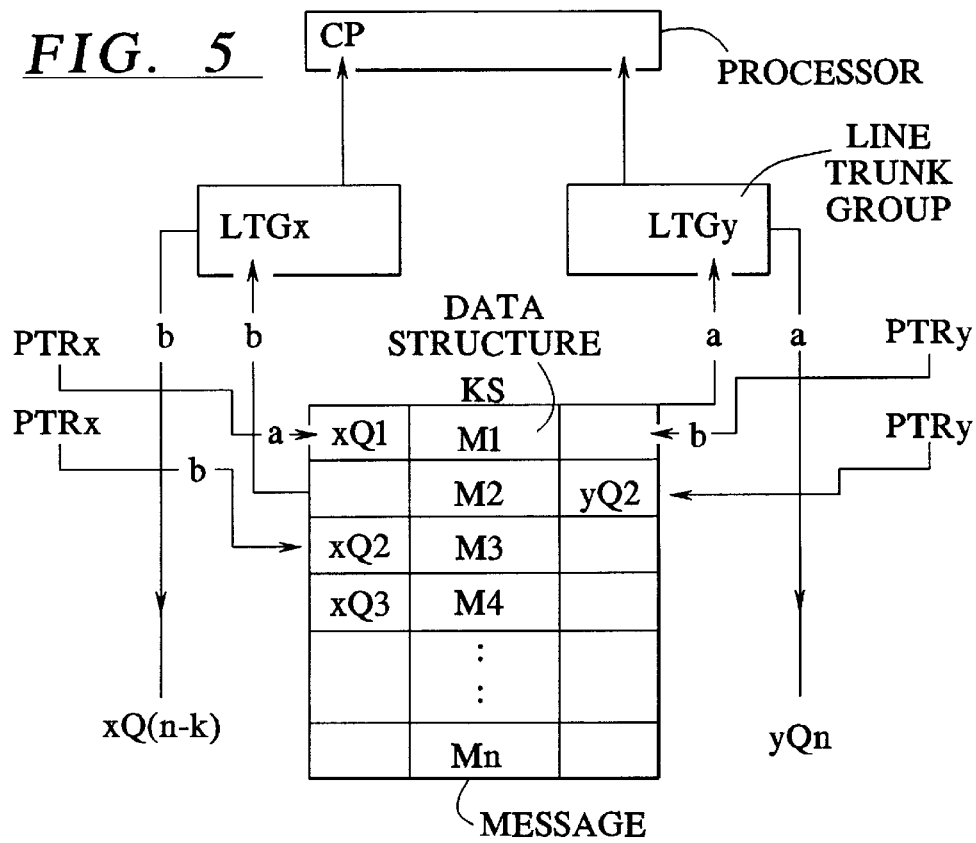
FIG. 5 shows two different cases.

FIG. 5 shows the two cases a and b mentioned above.

In case a, after the acknowledgement yQn has been received for the message Mn, the message M1 is sent as the next message via the y-path. Although, before the message M1 is sent, both pointers still point to the same element as a result of the first pass, namely to the element 1, an acknowledgement has, however, already been received on the x-side for the message M1 in the first pass, for which reason only the y-side transmission pointer is now incremented. In contrast, the transmission pointer PTRx remains at the element 1 in this case.

In case b, receipt of the acknowledgement xQ (n−k) for the message M (n−k) confirms that the x-side transmission pointer is pointing to an element which has already been sent. In this case, the x-side transmission pointer is incremented until an element which is still to be transmitted (an element without an x acknowledgement) is found on the x-side. In contrast, the y-side transmission pointer remains at the element 1 in this case.

Thus, the chain structure has been dealt with completely after two passes for the x-side and y-side, provided no new elements have been attached or linked to the end. In principle, the end criterion for one side is satisfied when there are no more elements to be transmitted during an entire pass.

The application of the invention is, of course, not limited to two transmission paths x and y according to the exemplary embodiment, but can also be applied to more than two transmission paths in an analogous manner. Furthermore, it is not essential, as in the exemplary embodiment, for there to be intermediate controllers LTGx and LTGy on the transmission paths x and y, which intermediate controllers LTGx and LTGy likewise have to be supplied with all the messages, for which reason the chain structure KS must be run through a second time in the course of the transmission method in the case of the exemplary embodiment.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for sending a plurality of respectively different messages from a lower-level controller to a higher-level controller, a similar plurality of bidirectional physical transmission paths being provided for sending the messages, the method comprising the steps of:

first transmitting the messages, for initialization, via the transmission paths, each of the messages being transmitted via a respective one of the transmission paths;

acknowledging each message, which is received by the higher-level controller, to the lower-level controller, each respective acknowledgment being sent back via the respective transmission path by which the respective message was received; and sending a further message as soon as an acknowledgment of a previous message is received, each further message being sent via the respective transmission path by which the respective acknowledgment was received.

2. The method as claimed in claim 1, wherein:

the messages are sent via intermediate controllers in the transmission paths to the higher-level controller, each of which intermediate controllers likewise requires all the messages for processing;

each message which is received by an intermediate controller is acknowledged to the lower-level controller;

the acknowledgments are stored in a message-specific and transmission-path-specific manner in the lower-level controller;

after messages have been sent for the first time, all messages are sent at least one further time in a direction of the higher-level controller, the intermediate controllers no longer passing these messages on to the higher-level controller, and the lower-level controller using the stored acknowledgments to ensure that a message which has already been acknowledged by an intermediate controller is not sent to said intermediate controller again.

3. The method as claimed in claim 1, wherein:

for each transmitted message, receipt of a corresponding acknowledgment is monitored by a timer;

a message for which no acknowledgment has been received by a time an associated timer times out is transmitted once again on another transmission path.

4. A transmitting device for sending a plurality of respectively different messages from a lower-level controller to a higher-level controller, comprising:

a data structure which buffer-stores messages in the lower-level controller, said messages being intended to be sent to a higher-level controller via a similar plurality of bidirectional transmission paths;

one pointer per transmission path which, for each path, points to a next message to be sent within the data structure, after a message having been sent, the respective pointer being moved to the next message to be sent;

a means for initialization which initializes the transmission of the messages via the transmission paths, each of the messages being transmitted via a respective one of the transmission paths; and a means for transmission which always sends a message which is defined by the respective pointer to be the next to be sent, whenever a respective acknowledgment for a previous message has been received by the lower-level controller, the next message being sent via the respective transmission path by which the last acknowledgment was received.

5. The transmitting device as claimed in claim 4, wherein said data structure is a chain structure, as a result of which messages are linkable into the data structure while messages are being sent from the data structure.

* * * * *